US008838296B2

(12) United States Patent (10) Patent No.: US 8,838,296 B2
Fischer et al. (45) Date of Patent: Sep. 16, 2014

(54) NETWORK, IN PARTICULAR FOR AN AIRCRAFT AND SPACECRAFT, METHOD AND AIRCRAFT AND SPACECRAFT

(75) Inventors: Wolfgang Fischer, Jork (DE); Peter Klose, Hamburg (DE); Torben Haselau, Hamburg (DE); Matthias Heinisch, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 193 days.

(21) Appl. No.: 13/477,650

(22) Filed: May 22, 2012

(65) Prior Publication Data

US 2012/0303183 A1 Nov. 29, 2012

Related U.S. Application Data

(60) Provisional application No. 61/489,454, filed on May 24, 2011.

(30) Foreign Application Priority Data

May 24, 2011 (DE) .......................... 10 2011 076 357

(51) Int. Cl.
*H04B 7/185* (2006.01)
*G06F 17/00* (2006.01)
(52) U.S. Cl.
USPC .......... 701/3; 455/512; 370/395.42; 370/461; 370/462; 370/463; 709/225; 709/229
(58) Field of Classification Search
CPC ... H04L 63/105; H04L 63/162; H04L 63/164; H04B 7/18539; H04B 7/18532; H04W 12/06; H04W 12/08; H04W 12/10; H04W 72/1242; G08G 5/0017; G08G 5/0021; G06F 13/18; G06F 13/30; G06F 13/34; G06F 21/60; H04Q 2213/053

USPC ............ 701/3; 455/427, 431, 572; 370/395.4, 370/395.42, 458, 461–463; 709/223–226, 709/229
See application file for complete search history.

(56) References Cited

U.S. PATENT DOCUMENTS 5,631,906 A * 5/1997 Liu ............................... 370/455
6,542,739 B1 * 4/2003 Garner ......................... 455/427
(Continued)

FOREIGN PATENT DOCUMENTS

DE 699 31 052 11/2006
DE 10 2008 043 622 5/2010
(Continued)

OTHER PUBLICATIONS

German Office Action for Application Serial No. DE 10 2011 076 357 dated Jan. 31, 2012.

*Primary Examiner* — Russell Frejd
(74) *Attorney, Agent, or Firm* — Jenkins, Wilson, Taylor & Hunt, P.A.

(57) ABSTRACT

The present invention provides a network, in particular for an aircraft and spacecraft, comprising a network line and at least two network access devices which are interconnected by the network line and between which data of different levels of priority can be transmitted, the network access devices being formed so as allocate data with a level of priority allocated to the respective data, at least two different levels of priority being provided for the data depending on the relevance of the respective data, and the data being transmitted on the network line in fixed time slots depending on the level of priority assigned in each case. The present invention further provides a method and an aircraft and spacecraft.

13 Claims, 3 Drawing Sheets

(56) References Cited

U.S. PATENT DOCUMENTS

| | | | |
|---|---|---|---|
| 6,850,490 B1 * | 2/2005 | Woo et al. | 370/230 |
| 7,009,996 B1 | 3/2006 | Eddy et al. | |
| 7,206,320 B2 * | 4/2007 | Iwamura | 370/448 |
| 8,416,750 B1 * | 4/2013 | Vargantwar et al. | 370/337 |
| 8,500,556 B2 * | 8/2013 | Morrow et al. | 463/42 |
| 2003/0067903 A1 * | 4/2003 | Jorgensen | 370/338 |
| 2005/0058149 A1 * | 3/2005 | Howe | 370/428 |
| 2005/0065669 A1 | 3/2005 | Roux et al. | |
| 2006/0146864 A1 * | 7/2006 | Rosenbluth et al. | 370/458 |

FOREIGN PATENT DOCUMENTS

| | | |
|---|---|---|
| WO | WO 2010/052333 | 5/2010 |
| WO | WO 2010/094680 | 8/2010 |

\* cited by examiner

NETWORK, IN PARTICULAR FOR AN AIRCRAFT AND SPACECRAFT, METHOD AND AIRCRAFT AND SPACECRAFT

CROSS-REFERENCE TO RELATED APPLICATIONS

This application claims the benefit of and priority to U.S. Provisional Application No. 61/489,454, filed May 24, 2011 and German Patent Application No. 10 2011 076 357.0 filed May 24, 2011, the entire disclosures of which are herein incorporated by reference.

FIELD OF THE INVENTION

The present invention relates to a network. The present invention further relates to a method for transmitting data and to an aircraft and spacecraft.

BACKGROUND OF THE INVENTION

Although applicable to any data network, the present invention and the problem on which it is based will be explained in greater detail below with reference to data networks in aircraft and spacecraft.

Modern network topologies may comprise different data networks. In this case, different network participants may be allocated to the respective data networks based on the function or relevance thereof.

Documents WO 2010052333 and WO 2010094680 each disclose a data network of this type, in particular for use in an aircraft and spacecraft.

With regard to aircraft, data networks are known for example for the following functional domains: the aircraft control domain, the airline information service domain and the passenger information and entertainment services domain. The aircraft control domain comprises the functions vital for the operation of the aircraft and for air traffic control communication. The airline information service domain contains functions which are advantageous for the operation of the aircraft but are not vital. Finally, the passenger information and entertainment services domain contains entertainment functions and communication functions aimed directly at aircraft passengers.

The functions of the individual domains also determine the relevance thereof. In order to prevent, for example, network participants of the passenger information and entertainment services domain from having an undesired influence on vital functions of, for example, the aircraft control domain, the respective data networks which serve the respective domains are currently subject to strict physical separation.

Communication between the participants of individual domains is therefore only possible via communication devices or servers specifically provided for this purpose in the respective domains. Said servers monitor network traffic between domains and prevent the respective domains being disrupted by network traffic from another domain.

In aircraft, however, there is always a general need to minimise the amount of cabling and therefore the complexity of the cable harness in terms of weight and cost. However, each data network in the aircraft must be provided with its own data cables, servers, switches, routers and the like.

SUMMARY OF THE INVENTION

It is an object of the present invention to provide a less complex network, while still retaining functionality.

This object is achieved according to the invention by a network having the features of claim 1, by a method having the features of claim 10 and by an aircraft and spacecraft having the features of claim 15.

The following is accordingly provided:

A network, in particular for an aircraft and spacecraft, comprising a network line and at least two network access devices which are interconnected by the network line and between which data of different levels of priority can be transmitted, the network access devices being formed so as to allocate data with a level of priority allocated to the respective data, at least two different levels of priority being provided for the data depending on the relevance of the respective data, and the data being transmitted on the network line in fixed time slots depending on the level of priority assigned in each case.

A method for transmitting data, in particular data of an aircraft and spacecraft, comprising the steps of providing a network according to the invention, assigning a level of priority allocated to the respective data to the data, at least two different levels of priority being provided for the data depending on the relevance of the respective data, and transmitting the data on the network line in fixed time slots depending on the level of priority assigned in each case.

An aircraft and spacecraft comprising at least one network according to the invention.

The knowledge on which the present invention is based is that it is not necessary to configure functionally or logically separated data networks as physically separated data networks. The idea on which the present invention is based is that of transmitting data from separately configured data networks, to which different levels of priority are also assigned, over a single physical network.

For this purpose, the present invention makes provision for allocating different levels of priority to individual data items. The levels of priority of individual data items may be determined, for example, on the basis of the relevance thereof. In this way, data of the greatest relevance would, for example, receive the highest levels of priority.

The present invention further makes provision for transmitting data, based on the level of priority allocated to individual data items, from a network access device to at least one further network access device over a network line. This transmission of data on the basis of the level of priority thereof ensures that data with different levels of relevance can be transmitted over a single network line. This also ensures that data of high relevance is not influenced by the transmission of data of low relevance.

It is therefore possible, in the particular sections of an aircraft cabin where the respective cables for individual data networks are laid, for example, in parallel, for the network line of the network according to the invention to replace parallel cables of this type. In the example given at the outset of an aircraft network system divided into three domains, this would allow the cables of two of the data networks to be dispensed with.

This makes it possible to achieve a simpler, less complex, more cost-effective and, in particular, lighter network architecture.

Advantageous embodiments and improvements of the invention are set out in the sub-claims.

According to a preferred development, the network access device has at least two data interfaces, each data interface being connected to a different data network and a different level of priority being allocated in each case to the data from each data network. This makes it possible to assign a level of priority to individual data networks in a selective manner and to treat all the data from one data network as having the same level of priority. In this way, data from differing data networks with different levels of relevance, for example different levels of relevance to safety, may be transmitted over a network according to the invention. The system, however, ensures that data corresponding to the data network with a higher level of priority are processed in a preferential manner. Furthermore, this way of allocating a level of priority to data on the basis of a corresponding data network is a very simple type of priority allocation. In a further development, levels of priority may be assigned to individual data items on the basis of an examination of the content of the data.

According to a further preferred development, a network access device for controlling the transfer of data in the form of data packets is formed so as to arrange first data packets in a sequence, determined by the level of priority assigned to the data, in time slots intended to be transmitted over the network line. Additionally or alternatively, a network access device is formed so as to output the first data packets from a time slot received over the network line as first data packets on the respective data interface. In this way, first data packets with lower levels of priority are only arranged in a time slot if a first data packet with a higher level of priority has already been arranged in the respective time slot. Transmitting a plurality of individual first data packets from the data networks within a single network line time slot makes it possible to transmit a plurality of first data packets from different data networks in a deterministic manner over the network line. In this way, data from a data network with a high level of priority may be transmitted on the network line at the same time as data from a data network with a low level of priority. This thus effectively prevents data with a high level of priority from blocking data with a low level of priority. This also makes it possible to use a network according to the invention without having to preconfigure the data traffic from individual data networks. In this case, a guaranteed bandwidth may be provided, at least for the network with the highest level of priority. The other networks are operated using the "best-effort method", i.e. the largest possible bandwidth is provided for the other networks.

In a further development, a network access device for controlling the transfer of data in the form of data packets is formed so as to arrange first data packets in a sequence, determined by the level of priority assigned to the data, in second data packets intended to be transmitted over the network line. If the data from the data networks are transmitted in an individual second data packet rather than as individual data packets in a time slot, it is possible to transmit data from a plurality of data networks simultaneously by transmitting a single second data packet.

In particular, in a preferred development, first data packets are transmitted in time slots in a manner transparent to the receiver of the first data packets on the respective data network. This has the advantage that a network according to the invention may be used within an existing network structure without the various existing network participants having to be adapted accordingly. This makes it possible to implement the network according to the invention in a more rapid and cost-effective manner.

In a further preferred development, defective data on the network line are not discarded and data are transmitted on the network line by bypassing predetermined standards. If predetermined standards are bypassed during the transmission of data, the data transmission may be adapted to the respective field of application. For example, it is possible to prevent defective data packets from being discarded automatically.

In a further preferred development, the network access device is formed so as to arrange first data packets in a time slot until the time slot has reached a predetermined maximum size. This makes it possible to control the data traffic on the network line in a more effective manner. Furthermore, it is possible for a network according to the invention comprising a plurality of possible network cards, which define a particular time slot size, to be operated as a network line. This makes it possible to adapt the network to different basic conditions, thus allowing said network to be used in a wide range of applications.

In particular, in a preferred development, a header precedes the first data packets in the time slot and at least contains an item of information on the length of the respective first data packet. If a header for a first data packet in a time slot specifies how large the respective first data packet is, it is very simple to extract the first data packet from the time slot without having to carry out a time-consuming analysis of the content of the data in the time slot. This makes it possible to relay the individual first data packets rapidly.

In a further preferred development, the network access device has a buffer memory in which it is possible to store first data packets which, on account of the predetermined maximum size of a time slot, cannot be conveyed in a time slot immediately after the respective first data packet is received, an individual memory region being provided for the data from each data network. This ensures that none of the first data packets are lost, thereby ensuring reliable operation, particularly for data networks with low levels of priority. In a development, the buffer memory may be formed as a single memory chip with a memory region for data from each data network or as separate memory chips. If different memory regions are provided for data from individual data networks, it is also possible to ensure that data from a data network with a low level of priority is not mistakenly overwritten with data from a data network with a higher level of priority.

In a further preferred development, at least one second network line is provided, the network access device being formed so as to relay the data in a time slot between the network lines and/or to output the relayed data in a time slot on the respective data interfaces. If more than two network lines are provided, it is possible to adapt the network in a flexible manner to the basic conditions of an application. If, for example, an aircraft has more than two regions in which data network participants are concentrated, this makes it possible to lay a network line to each of said regions. This further simplifies the network architecture of the aircraft and achieves further weight and cost savings.

In a further preferred development, at least one data interface of the network access device is formed in each case as a real-time network interface which is allocated a higher level of priority in comparison with data interfaces which are not real-time network interfaces. If real-time interfaces are used, the network may be used in a number of further applications which require data to be transmitted in real time. Assigning a higher level of priority to real-time interfaces ensures that the respective real-time requirements are met.

In particular, in a preferred development, the first data packets of at least the real-time interface with the highest level of priority have a fixed data size. If the first data packets of the real-time network interfaces have a fixed size, it is possible to relay the first data packets very efficiently as it is no longer necessary to read in a header in order to extract the first data packets of fixed size. The first data packets of the real-time data interfaces preferably receive the highest levels of priority and are therefore always arranged at the beginning of a time slot, although a different arrangement is, of course, also possible. In an embodiment of this type, the network access device can extract the first data packets by simply copying data regions of said fixed size of the first data packets from the time slots.

In a further preferred development, the network access device has an arbitration means formed so as to perform access arbitration on the network line. Performing access arbitration on a network line makes it possible to achieve rapid, error-free data transmission on the network line. In particular, this effectively prevents the loss of data, for example, through the collision of two data packets.

In a further preferred development, the network access device has an error handling device formed so as to control the transmission of data from data interfaces on the network line in the event of an error. If, for example, a network access device receives such a large amount of data via a data interface with a low level of priority that it would not be possible to ensure that data with a higher level of priority could be transmitted safely, the error handling device prevents the transmission of data from said interface with a low level of priority. The error handling device controls the transmission of data in such a way that data with the highest level of priority can continue to be transmitted.

In a further preferred development, the network line is formed as an Ethernet line and/or a glass fibre line and/or an ATM line and/or a WLAN and/or as a CAN line and/or as a FlexRay line, and/or the data interfaces are formed as Ethernet interfaces and/or glass fibre interfaces and/or ATM interfaces and/or WLAN interfaces and/or as CAN interfaces and/or as FlexRay interfaces. If different embodiments are provided both for the network line and for the data interfaces, the network can be adapted in a flexible manner to different applications.

The above embodiments and developments may be used in any practical combination. Further possible embodiments, developments and implementations of the invention also include combinations not explicitly mentioned of features of the invention described above or below with reference to the embodiments. In particular, a person skilled in the art may also add individual aspects as improvements or additions to the respective basic form of the present invention.

BRIEF DESCRIPTION OF THE DRAWINGS

The invention is described in greater detail below on the basis of embodiments with reference to the appended drawings, in which.

DETAILED DESCRIPTION OF THE INVENTION

Figure 1:
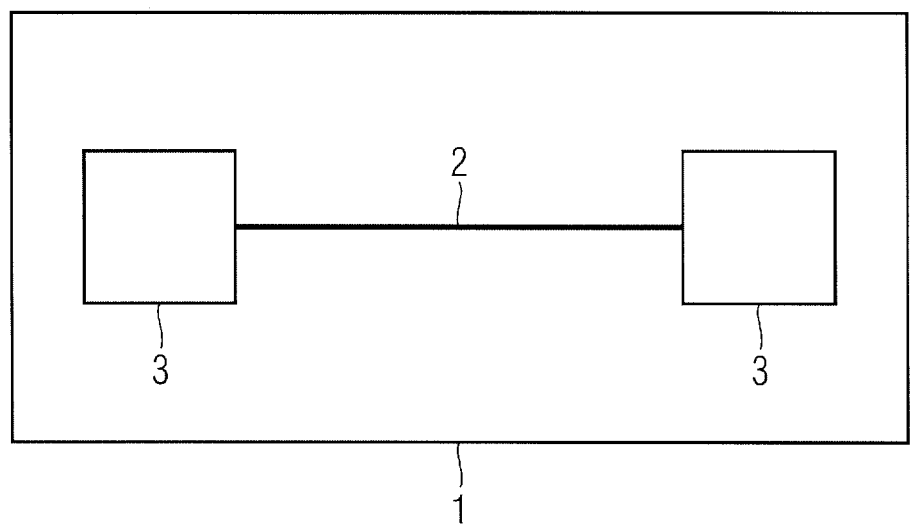
FIG. 1 is a block diagram of an embodiment of a network according to the invention.

In the figures, like reference numerals denote like components or components with the same function, unless otherwise stated.

FIG. 1 is a block diagram of an embodiment of a network 1 according to the invention.

The network 1 from FIG. 1 has two network access devices 3 which are connected by a network line 2.

The network access devices 3 in FIG. 1 are formed so as to transmit data over the network line 2 in accordance with a level of priority assigned to the data in each case. Different levels of priority are respectively allocated to the data. Data with a high level of priority are preferentially transmitted over data with a low level of priority.

Figure 2:
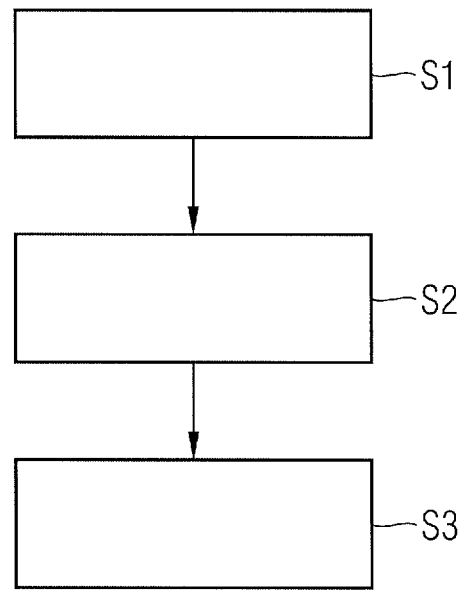
FIG. 2 is a flowchart of an embodiment of a method according to the invention.

FIG. 2 is a flowchart of an embodiment of a method according to the invention for transmitting data.

In a first step S1, a network 1 according to the invention is provided. In a further step S2, different levels of priority are assigned in each case to the data to be transmitted, for example on the basis of the relevance thereof. The relevance of the data may, for example, be determined on the basis of the relevance to safety, data transmission time requirements or the like. Finally, in a step S3, data are transmitted on the network line 2 in fixed time slots in accordance with the respective levels of priority.

The method according to the invention ensures that data are transmitted over the network line 2 in such a way that data with a high level of priority are preferentially transmitted before data with a low level of priority.

Figure 3:
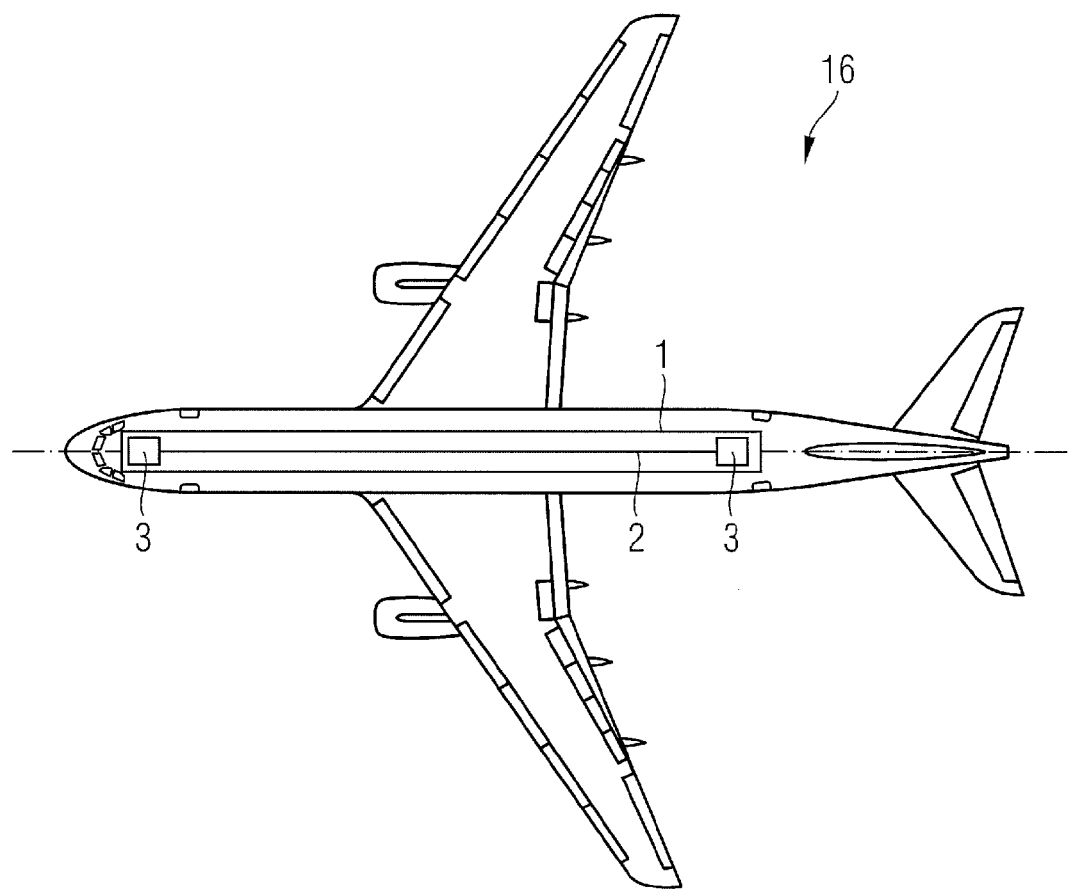
FIG. 3 is a block diagram of an embodiment of an aircraft according to the invention.

FIG. 3 shows an aircraft 16 according to the invention comprising a network 1 according to the invention.

In an aircraft 16 of this type, it is possible to transmit data over the network line 2 of the network 1 based in each case on a different level of priority assigned to the data. If, for example, the aircraft 16 has a first data network 6 which transmits safety-related flight data, and a second data network 6 which transmits infotainment data, a higher level of priority may be assigned to the data from the first data network 6 than to the data from the second data network 6. This ensures that the safety-related data from the first data network 6 is always preferentially transmitted before the infotainment data from the second data network 6. This ensures that safety-related data are transmitted as quickly as possible, even though data from both data networks 6 are transmitted over a single network line 2.

If, as shown in FIG. 3, a first network access device 3 is mounted at a cabin end and a second network access device 3 is mounted at a tail end of the aircraft 16, the network cables of the aircraft networks which transport data from the cabin of the aircraft 16 to the tail of the aircraft 16 may be replaced by a single network 1 according to the invention. This reduces the complexity, weight and cost of the cabling in the aircraft 16.

In further embodiments, the network access devices 3 may be provided in other locations in the aircraft, for example at the centre of the aircraft cabin or in the wings.

In further embodiments, the network access devices 3 may be provided with different data interfaces 5. This enables selected data networks 6, the data of which are transmitted jointly over a network line 2, 2a, to be disconnected from the network line 2, 2a, by means of a network access device 3, in a region of the aircraft.

Figure 4:
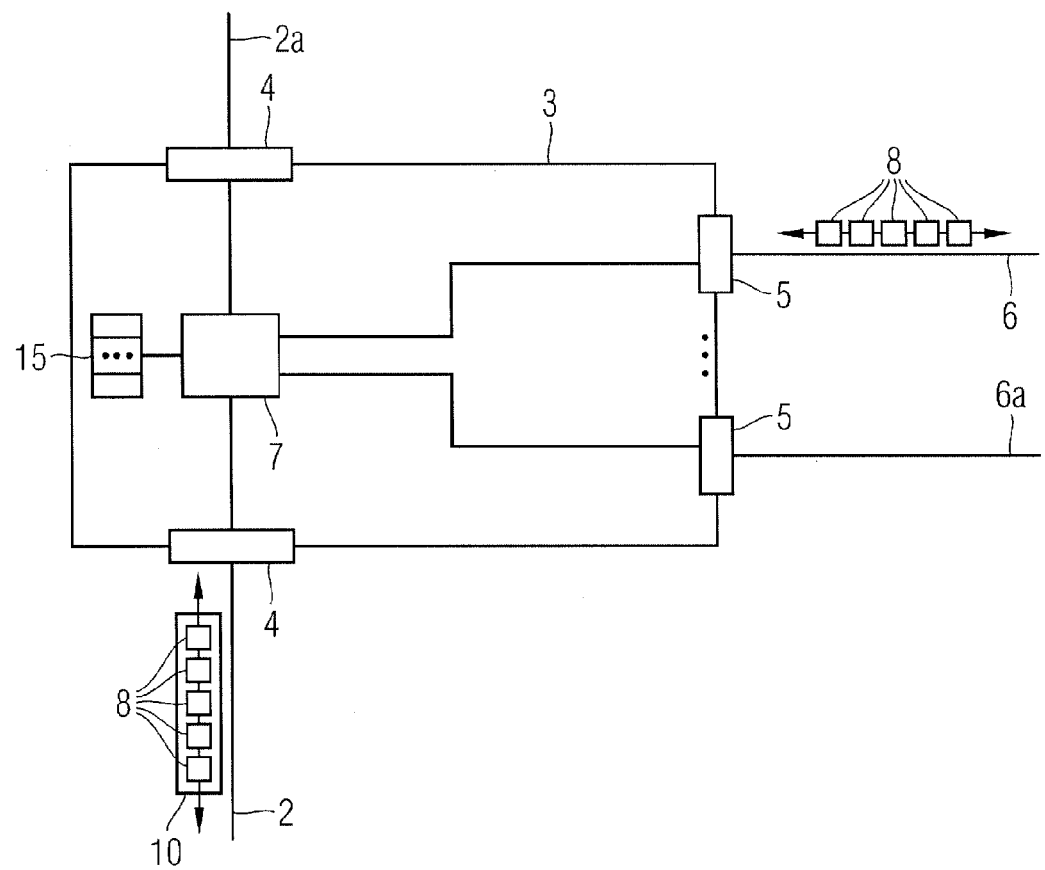
FIG. 4 is a block diagram of an embodiment of a network access device according to the invention.

FIG. 4 is a block diagram of a further embodiment of a network access device 3 according to the invention.

The network access device 3 in FIG. 4 has two Gigabit Ethernet interfaces 4, each connecting the network access device 3 to a network line 2, 2a. The network access device 3 in FIG. 4 also has two data interfaces 5, each connecting the network access device 3 to a data network 6, 6a. Further data interfaces 5 are provided between the two data interfaces 5, as indicated by the three dots. The network access device 3 in FIG. 4 also has a control device 7 which is connected to the Gigabit Ethernet interfaces 4, the data interfaces 5 and a buffer memory 15 comprising one memory region for each data interface 5. In further embodiments, the Gigabit Ethernet interfaces 4 may also take the form of glass fibre interfaces 4, ATM interfaces 4 or the like.

Finally, first data packets 8, which are transmitted bidirectionally (indicated by an arrow with a point at either end) on one of the data networks 6, and time slots 10, in which data are transmitted bidirectionally (also indicated by an arrow with a point at either end) on the network line 2, are provided. The first data packets 8 and the time slots 10 in FIG. 4 are only shown on one data network 6 and one network line 2 by way of example. In further embodiments, first data packets 8 may also be transmitted on further data networks 6, 6a and data in time slots 10 may also be transmitted for example on the network line 2a.

Data are transmitted on the network line 2 by bypassing predetermined standards. For example, data packets transmitted in error should not be discarded automatically. Conventional routers, switches or the like would, for example, automatically discard data transmitted in error so they therefore cannot be used in a network according to the invention.

The control device 7 of the network access device 3 in FIG. 4 is formed so as to relay data in the form of first data packets 8 and in time slots 10 between the data interfaces 5 and the Gigabit Ethernet interfaces 4 and vice versa. For this purpose, a level of priority is allocated to each data interface 5 and therefore to each data network 6, 6a, on the basis of which the control device 7 arranges the first data packets 8 received at the data interfaces 5 in the time slots 10. In this way, the first data packets 8 are arranged one after another in a time slot 10 in accordance with the level of priority thereof. If no first data packets are received at any of the data interfaces 5, an empty first data packet 8 or a header 11 specifying a size of zero is inserted, instead of a first data packet 8, in the position in a time slot 10 which corresponds to the level of priority of the respective first data interface 5.

The time slots 10 in FIG. 4 have a predetermined maximum size. If first data packets 8 are received at a plurality of data interfaces 5, it may not be possible to integrate all the first data packets 8 in a common time slot 10 without exceeding the maximum size of the time slot 10. In this case, first data packets 8 are arranged in a time slot 10 in a sequence determined by the level of priority of the respective data interface 5 until the maximum size of the time slot 10 is reached. The first data packets 8 which cannot be arranged in the time slot 10 on account of the low level of priority thereof are buffered in the buffer memory 15 by the control device 7 and are conveyed in a further time slot 10.

Figure 5:
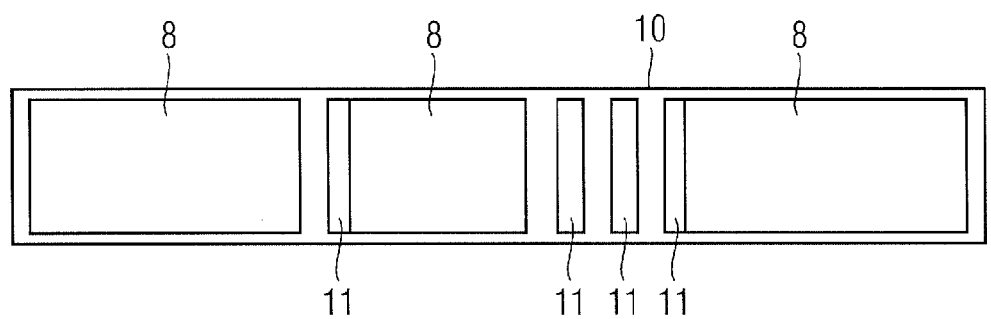
FIG. 5 is an illustration of an embodiment of a time slot according to the invention.

FIG. 5 is an illustration of an embodiment of a time slot 10 according to the invention.

The time slot 10 in FIG. 5 is shown as a square and has five portions. The first portion contains a first data packet 8. The second and fifth portions each contain a first data packet 8 with a preceding header 11. Finally, the third and fourth portions each contain only a header 11. Each header 11 contains an item of information on the length of the respective first data packet 8 to which said header 11 is attached.

The first data packet in the first portion is the first data packet 8, of fixed size, from a real-time interface 5. Since the first data packet 8 from the real-time interface 5 has a fixed size, said first data packet 8 does not require a header 11 specifying the size of the respective first data packet.

The further portions of the time slot 10 each have headers 11 specifying the size of the respective first data packet 8 following the respective header 11. The headers 11 of the third and fourth portions each specify a size of zero for the respective first data packet 8. A data packet 8 therefore does not follow either of said headers 11.

If a network access device 3 receives data in a time slot 10, the network access device 3, after reading out the first data packets 8 of fixed size, reads out the following data packets 8 of variable size. For this purpose, the network access device 3 first reads out the header 11 of the respective first data packet. The network access device 3 then reads out the size of the respective data packets 8 from the header 11. This allows the network access device 3 to determine where the next header 11 begins in the time slot 10.

In order to ensure that the receiving network access device 3 is able to allocate the respective first data packets 8 in a time slot 10 to the corresponding data interfaces 5, either first data packets 8 or headers 11 specifying a size of zero must be transmitted in a time slot 10 for each data interface 5. This allows the receiving network access device 3 to allocate the first data packets 8 to the data interfaces 5 on the basis of the level of priority of the respective data interface 5 when extracting the individual first data packets 8 from the time slot 10. In this way, the first data packet 8 is allocated to the data interface 5 with the highest level of priority. The second first data packet 8 is allocated to the data interface 5 with the second-highest level of priority. The network access device 3 continues with this allocation until all of the first data packets 8 in a time slot 10 are allocated to a corresponding data interface 5. If a header 11 shows a size of zero for a first data packet 8, no first data packet 8 is transmitted at the respective data interface 5.

In a further embodiment, the first data packets 8 are transmitted in second data packets 8a on the network line 2. In this case, the network access device 3 handles the data in a second data packet 8a as described for the data in a time slot.

In further embodiments, the headers 11 contain an item of information on the level of priority of the data interface 5 via which the respective first data packet 8 was received. This allows a network access device 3 to allocate the respective first data packets 8 to the corresponding data interfaces 5 even if no headers 11 specifying a size of zero are transmitted in a time slot 10 for data interfaces 5 at which no data have currently been received.

Although the present invention has been described in this document with reference to preferred embodiments, it is not limited thereto and may be modified in a variety of ways.

For example, the present invention may also be used in vehicles other than aircraft and spacecraft or in other applications. The present invention may, for example, be used in a train, a ship, a motor vehicle, lorry or the like. The present invention is, however, particularly advantageous in aircraft and spacecraft on account of the problems set out at the outset in relation to weight and cost.

LIST OF REFERENCE NUMERALS 1 network
2,2a network lines
3 network access device
4,5 data interfaces
6,6a data networks
7 control device
8,8a data packet
10 time slot
11 header
15 buffer memory
16 aircraft

The invention claimed is:
1. A network for an aircraft and spacecraft,
   comprising a network line;

comprising at least two network access devices which are interconnected by the network line and between which data of different levels of priority can be transmitted, the network access devices being formed so as to allocate data with a level of priority allocated to the respective data, at least two different levels of priority being provided for the data depending on the relevance of the respective data, and the data being transmitted on the network line in fixed time slots depending on the level of priority assigned in each case;

wherein the network access devices have at least two data interfaces, each data interface being connected to a different data network, a different level of priority being allocated in each case to the data from each data network.

2. The network according to claim 1, wherein the network access device for controlling the transfer of data in the form of data packets is formed so as to arrange first data packets in network line time slots in a sequence determined by the level of priority assigned to the data and/or to output the first data packets from a time slot received over the network line as first data packets on the respective data interface.

3. The network according to claim 1, wherein the network access device is formed so as to arrange first data packets in a time slot until the time slot has reached a predetermined maximum size.

4. The network according to claim 2, wherein the network access devices have a buffer memory in which it is possible to store first data packets which, on account of the predetermined maximum size of a time slot, cannot be conveyed in a time slot immediately after the respective first data packet is received, an individual memory region being provided for the data from each data network.

5. The network according to claim 1, wherein at least one second network line is provided, the network access devices being formed so as to relay the data in a time slot between the network lines and/or to output the relayed data in a time slot on the respective data interfaces.

6. The network according to claim 1, wherein at least one data interface of the network access device is formed in each case as a real-time network interface which is allocated a higher level of priority in comparison with data interfaces which are not real-time network interfaces.

7. The network according to claim 1, wherein the network access device has an arbitration means formed so as to perform access arbitration on the network line.

8. The network according to claim 1, wherein the network line is formed as an Ethernet line and/or a glass fibre line and/or an ATM line and/or a WLAN and/or as a CAN line and/or as a FlexRay line, and/or in that the data interfaces are formed as Ethernet interfaces and/or glass fibre interfaces and/or ATM interfaces and/or WLAN interfaces and/or as CAN interfaces and/or as FlexRay interfaces.

9. A method for transmitting data of an aircraft and spacecraft, the method comprising:

providing a network, the network comprising a network line and comprising at least two network access devices which are interconnected by the network line and between which data of different levels of priority can be transmitted, the network access devices being formed so as to allocate data with a level of priority allocated to the respective data, at least two different levels of priority being provided for the data depending on the relevance of the respective data, and the data being transmitted on the network line in fixed time slots depending on the level of priority assigned in each case;

assigning a level of priority allocated to the respective data to the data, at least two different levels of priority being provided for the data depending on the relevance of the respective data, comprising providing at least two data networks, and assigning a different level of priority in each case to the data from each data network;

transmitting the data on the network line in fixed time slots depending on the level of priority assigned in each case.

10. The method according to claim 9, wherein transmitting data comprises at least one of the following sub-steps for controlling the transfer of data in the form of data packets:

arranging first data packets in network line time slots in a sequence determined by the levels of priority; and/or outputting the first data packets from a time slot received over the network line as first data packets on the data interface corresponding to the respective level of priority.

11. The method according to claim 9, wherein when data is transmitted, the first data packets are arranged in a time slot until the time slot reaches a predetermined maximum size.

12. The method according to claim 9, wherein transmitting data comprises the following sub-steps:

providing at least one second network line;

relaying data in a time slot between the network lines; and/or outputting the first data packets of the relayed data in a time slot on the respective data interfaces.

13. An aircraft and spacecraft, comprising at least one network, the network comprising a network line and comprising at least two network access devices which are interconnected by the network line and between which data of different levels of priority can be transmitted, the network access devices being formed so as to allocate data with a level of priority allocated to the respective data, at least two different levels of priority being provided for the data depending on the relevance of the respective data, and the data being transmitted on the network line in fixed time slots depending on the level of priority assigned in each case, wherein the network access devices have at least two data interfaces, each data interface being connected to a different data network, a different level of priority being allocated in each case to the data from each data network.

* * * * *